US009992718B2

(12) United States Patent
Choo et al.

(10) Patent No.: US 9,992,718 B2
(45) Date of Patent: Jun. 5, 2018

(54) OPENFLOW CONTROLLER AND CONTROL METHOD FOR SUPPORTING HANDOVER IN MOBILE IPV6 BASED ON SOFTWARE DEFINITION NETWORK (71) Applicant: RESEARCH & BUSINESS FOUNDATION SUNGKYUNKWAN UNIVERSTIY, Suwon-si (KR)

(72) Inventors: Hyunseung Choo, Gwacheon-si (KR); Dongsoo Kim, Seoul (KR); Jinwoo Park, Bucheon-si (KR); Sang Gil Yeoum, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 55 days.

(21) Appl. No.: 14/926,428

(22) Filed: Oct. 29, 2015

(65) Prior Publication Data
US 2016/0127966 A1 May 5, 2016

(30) Foreign Application Priority Data
Oct. 29, 2014 (KR) ........................ 10-2014-0148461

(51) Int. Cl.
*H04W 12/06* (2009.01)
*H04W 80/04* (2009.01)
(Continued)

(52) U.S. Cl.
CPC .......... *H04W 36/023* (2013.01); *H04W 12/04* (2013.01); *H04W 12/06* (2013.01); *H04W 36/0016* (2013.01); *H04W 80/04* (2013.01)

(58) Field of Classification Search
CPC combination set(s) only.
See application file for complete search history.

(56) References Cited

U.S. PATENT DOCUMENTS

2015/0016340 A1* 1/2015 Itoh .................... H04W 36/0011
370/328
2015/0058938 A1* 2/2015 Gaspar .................. H04W 12/06
726/5
2015/0295833 A1* 10/2015 Mizukoshi ............ H04L 47/125
370/235

FOREIGN PATENT DOCUMENTS

KR 10-1088399 B1 12/2011
KR 10-1258238 B1 4/2013
WO WO 2014077352 A1 * 5/2014 ........... H04L 47/125

OTHER PUBLICATIONS

Raza, Syed Muhammad, et al. "Architecture for Reducing Handover Latency in PMIPv6 with OpenFlow," KIISE the 40th Proceedings of the Autumn Meeting, Nov. 15, 2013.

(Continued)

*Primary Examiner* — Yee Lam
(74) *Attorney, Agent, or Firm* — NSIP Law (57) ABSTRACT

The openflow controller include a storage device that stores an application to performing a handover based on a handover policy; and a processor that executes the application stored in storage device; wherein in response to execution of the application, the processor decides handover of the mobile node connected to a first mobile access gateway, and selects a second mobile access gateway as a handover target, and in order to allow a localized mobility anchor connected to the openflow controller to deliver data packets to the mobile node through the second mobile access gateway, instead of the first mobile access gateway, the processor sends a message to each of the first mobile access gateway, the second mobile access gateway, and the localized mobility anchor in response the handover policy.

18 Claims, 4 Drawing Sheets (51) Int. Cl.
*H04W 36/00* (2009.01)
*H04W 12/04* (2009.01)
*H04W 36/02* (2009.01)

(56) References Cited

OTHER PUBLICATIONS

Raza, Syed Muhammad, et al. "Leveraging PMIPv6 with SDN." Proceedings of the 8th International Conference on Ubiquitous Information Management and Communication. ACM IMCOM, Jan. 9, 2014.

\* cited by examiner

OPENFLOW CONTROLLER AND CONTROL METHOD FOR SUPPORTING HANDOVER IN MOBILE IPV6 BASED ON SOFTWARE DEFINITION NETWORK

CROSS-REFERENCE TO RELATED APPLICATION

This application claims the benefit of Korean Patent Application No. 10-2014-0148461 filed on Oct. 29, 2014, the disclosures of which are incorporated herein by reference.

STATEMENT REGARDING THIRD PARTY RESEARCH PROJECT

This work was supported by the ICT R&D program of MSIP/IITP, Republic of Korea. [B0101-15-1366, Development of Core Technology for Autonomous Network Control and Management].

This work was supported by Priority Research Centers Program through the National Research Foundation of Korea (NRF) funded by the Ministry of Education, Science and Technology (NRF-2010-0020210).

TECHNICAL FIELD

The embodiments described herein pertain generally to an openflow controller for supporting handover in Proxy Mobile IPv6 based on a software definition network, and a control method thereof.

BACKGROUND

Proxy Mobile IPv6 is a network-based mobility management protocol, which was enacted as a RFC 5213 standard document by the Internet Engineering Task Force (IETF) in 2008. Proxy Mobile IPv6 supports movement of a mobile node in a network, such that even when a mobile node accessed to a domain moves from one network to another network, the previously set connection can be continuously maintained without change in an IPv6 address set for the mobile node.

In Proxy Mobile IPv6, a localized mobility anchor is defined. The localized mobility anchor operates as a kind of a home agent for a mobile node within a mobile access gateway and a domain of Proxy Mobile IPv6 in order to support the mobility of the mobile node on behalf of the mobile node. The mobile access gateway registers information of the mobile node in the localized mobility anchor on behalf of the mobile node. Also, the mobile access gateway creates a localized mobility anchor and a bidirectional tunnel. The mobile node implements data communication with a corresponding node by using the created bidirectional tunnel.

In Proxy Mobile IPv6, one or more mobile nodes should pass one central control unit like the localized mobility anchor in order to communicate with one or more corresponding nodes. As such, in Proxy Mobile IPv6, there is a high possibility of deterioration of performance and occurrence of congestion due to traffic concentration on the central control unit. Further, in Proxy Mobile IPv6, when handover occurs during use of a real-time application, packet loss may occur due to handover latency.

The conventional inventions below reduce the handover latency and the packet loss in Proxy Mobile IPv6.

Korean Patent Publication No. 10-1258238 (entitled: MOBILE TELECOMMUNICATION SYSTEM USING PROXY MOBILE INTERNET PROTOCOL AND HANDOVER METHOD IN THE SAME) describes a technology of reducing handover latency and data loss by delivering binding information of a new mobile access gateway to a localized mobility anchor through a previous mobile access gateway and implementing proxy binding update in advance to set a multiple data transmission path.

In addition, Korean Patent Publication No. 10-1088399 (entitled: METHOD FOR HANDOVER BETWEEN PROXY MOBILE IPV6 DOMAINS) describes predicting movement of a mobile node in Proxy Mobile IPv6 based on handover, and delivering information of the mobile node to an external domain, and not a domain in which the mobile is currently being positioned, if the mobile node is predicted to move to the eternal domain.

SUMMARY

In view of the foregoing, example embodiments provide an openflow controller for supporting handover of a mobile node in a Proxy Mobile IPv6 environment based on a software definition network, and a control method thereof.

However, the problems sought to be solved by the present disclosure are not limited to the above description, and other problems can be clearly understood by those skilled in the art from the following description.

As a technical means for solving the above-described problem, in accordance with a first exemplary embodiment, there is provided an openflow controller for supporting handover of a mobile node in Proxy Mobile IPv6 based on a software definition network. The openflow controller include a storage device that stores an application to performing a handover based on a handover policy; and a processor that executes the application stored in storage device; wherein in response to execution of the application, the processor decides handover of the mobile node connected to a first mobile access gateway, and selects a second mobile access gateway as a handover target, and in order to allow a localized mobility anchor connected to the openflow controller to deliver data packets to the mobile node through the second mobile access gateway, instead of the first mobile access gateway, the processor sends a message to each of the first mobile access gateway, the second mobile access gateway, and the localized mobility anchor in response the handover policy.

Further, in accordance with a second exemplary embodiment, there is provided a control method of an openflow controller for supporting handover of a mobile node in Proxy Mobile IPv6 based on a software definition network. The method include deciding handover of a mobile node connected to a first mobile access gateway in response a handover policy; selecting a second mobile access gateway as a handover target in response the handover policy; and sending a message to each of the first mobile access gateway, the second mobile access gateway, and a localized mobility anchor connected to the openflow controller in response the handover policy in order to allow the localized mobility anchor to deliver data packets to the mobile node through the second mobile access gateway, instead of the first mobile access gateway.

In accordance with the example embodiments, by combining the existing Proxy Mobile IPv6 scheme and a software definition network with each other, it is possible to form a new network frame, and as a result, various ripple effects in the whole relevant industries can be expected.

Since the example embodiments can balance load of a network concentrated on a mobile access gateway by using an openflow controller, they can reduce deterioration of network performance resulting from congestion upon data transmission.

Further, the example embodiments can monitor connection status information of a mobile access gateway connected to a mobile node, and decide and implement handover before the connection of the mobile access gateway to the mobile node is disconnected. Also, since the example embodiments implement self-authentication based on the connection state information stored in the openflow controller without authentication by an authentication authorization accounting server, they can reduce handover delay time, and minimize packet loss through buffering during handover delay time.

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

Figure 1:
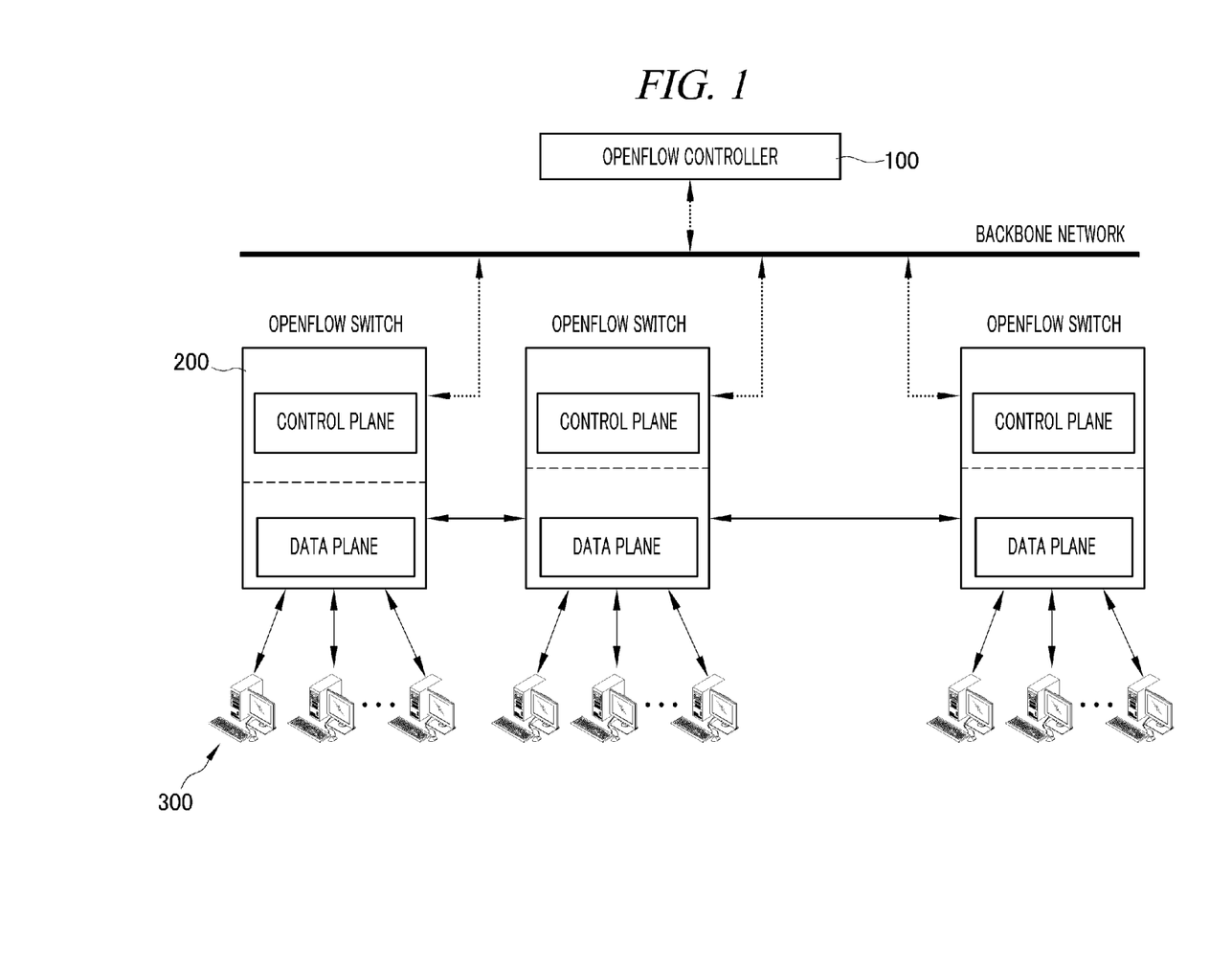
FIG. 1 is a conceptual diagram for depicting an openflow network.

First, an openflow network is described referring to FIG. 1.

FIG. 1 is a conceptual diagram for depicting an openflow network.

Openflow is one of interface standard technologies for a software definition network (SDN).

A network using openflow includes an openflow controller 100 and an openflow switch 200, and implements internal communication by using an openflow protocol. In this case, the openflow-based switch is divided into a data plane, which is embodied as hardware, and a control plane, which is embodied as software. In the openflow switch 200, centralized control of the data plane is possible. Through the control, a network manager can more effectively and flexibly manage a network.

In addition, the openflow switch 200 decides a method of processing data packets to be transmitted to the mobile node 300, a transmission method, and a transmission path depend on a command from the openflow controller 100, and delivers the data packets. In this case, the method of processing data packets, and a transmission path and method may be stored in a flow table included in the openflow switch 200.

Figure 2:
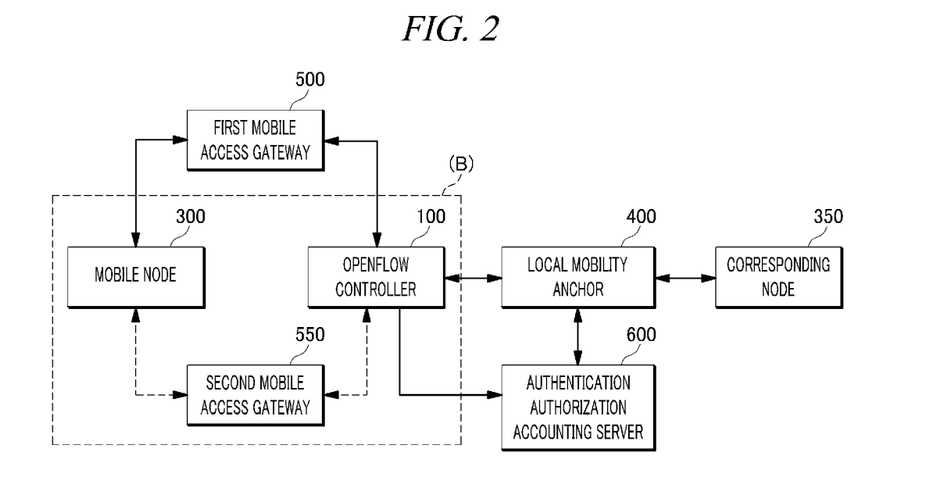
FIG. 2 is a system configuration diagram for depicting a whole Proxy Mobile IPv6 environment based on a software definition network in accordance with an example embodiment.
Figure 3:
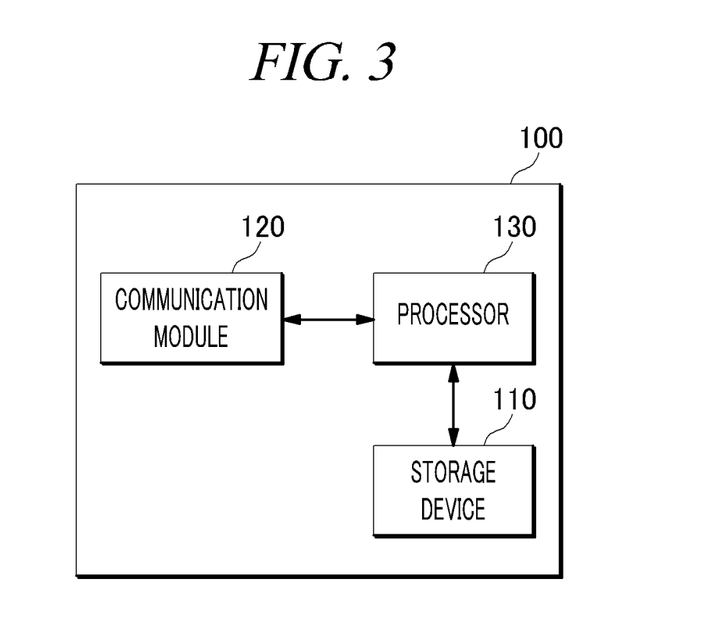
FIG. 3 is a configuration diagram of an openflow controller within the system illustrated in FIG. 2.

Next, a Proxy Mobile IPv6 environment based on a software definition network in accordance with an example embodiment is described referring to FIG. 2 and FIG. 3.

FIG. 2 is a system configuration diagram for depicting a whole Proxy Mobile IPv6 environment based on a software definition network in accordance with an example embodiment.

The Proxy Mobile IPv6 environment based on the software definition network in accordance with an example embodiment includes an openflow controller 100, one or more mobile nodes 300, a first mobile access gateway 500, a second mobile access gateway 550, a localized mobility anchor 400, an authentication authorization accounting server 600 and one or more corresponding nodes 350, which may be connected to one another through a network.

In this case, the network means a connection structure, which enables information exchange between a network terminal and each node like a server, and examples for the network include, but not limited to, a 3rd generation partnership project (3GPP) network, a long term evolution (LTE) network, a world interoperability for microwave access (WIMAX) network, Internet, a local area network (LAN), a wireless local area network (wireless LAN), a wide area network (WAN), a personal area network (PAN), a Bluetooth network, a satellite broadcasting network, an analogue broadcasting network, a digital multimedia broadcasting (DMB) network, and others.

In addition, the mobile node 300 includes a display, a memory, a processor and a communication module, and is a generic term of all terminals that can use a network during movement. For example, the mobile node 100 may include a wireless communication device assuring portability and mobility, i.e., any type of a handheld-based wireless communication device like a personal communication system (PCS), a global system for mobile communication (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), and a wireless broadband Internet (Wibro) terminal, etc. In addition, the mobile node 100 assures mobility like a notebook computer and a tablet PC, etc., and may include a smart device, such as a personal computer and a smart phone, which can implement wireless communication.

The first mobile access gateway 500 and the second mobile access gateway 550 may support mobility of the mobile node 300, on behalf of the mobile node 300, in Proxy Mobile IPv6. To this end, the first mobile access gateway 500 and the second mobile access gateway 550 register information of the mobile node 300 in the localized mobility anchor 400 on behalf of the mobile node 300, and creates a bidirectional tunnel with the localized mobility anchor 400. In addition, the first mobile access gateway 500 and the second mobile access gateway 550 may support data communication between the mobile node 300 and a corresponding node 350 based on the created bidirectional tunnel. In this case, the localized mobility anchor 400 may be a kind of a home agent for the mobile node 300 within a domain of Proxy Mobile IPv6.

The first mobile access gateway 500 in accordance with an example embodiment may mean a mobile access gateway, to which the mobile node 300 has been already accessed. In addition, the second mobile access gateway 550 may mean a handover target mobile access gateway, to which the mobile node 300 will be accessed through handover. In addition, the Proxy Mobile IPv6 environment based on the software definition network in accordance with an example embodiment may further include one or more mobile access gateways (not illustrated), in addition to the first mobile access gateway 500 and the second mobile access gateway 550.

The authentication authorization accounting server 600 implements authentication of the mobile node 300, the first mobile access gateway 500 and the second mobile access gateway 550. For example, when the mobile node 300 attempts access to the second mobile access gateway 550, which is a new mobile access gateway different from the first mobile access gateway 500 already accessed by the mobile node 300, the mobile node 300 sends a message including a mobile node identifier of the mobile node 300 to the second mobile access gateway. The second mobile access gateway that has received the message including the mobile node identifier of the mobile node 300 sends the mobile node identifier of the mobile node 300 and an authentication authorization accounting query message to the authentication authorization accounting server 600 to implement an authentication procedure for the mobile node 300. Once the authentication is completed, the authentication authorization accounting server 600 sends an authentication authorization accounting response message and a profile for the mobile node 300 to the second mobile access gateway 550.

The openflow controller 100 is a device, which manages the whole software definition network. Specifically, the openflow controller 100 calculates a path, through which the mobile node 300 implements data communication with the corresponding node 350. The openflow controller 100 delivers the calculated path to the openflow switch 200 to command implementation of data communication. In addition, in order to assure the mobility of the mobile node 300, the openflow controller 100 supports access and handover of the mobile node 300 through message exchange with the localized mobility anchor 400 and the authentication authorization accounting server 600.

In this case, the openflow controller 100 may operate as an independent device, or be equipped and operate as a server program or service in a server computer or the like.

This openflow controller 100 is more specifically described referring to FIG. 3.

FIG. 3 is a configuration diagram of the openflow controller 100 within the system illustrated in FIG. 2.

The openflow controller 100 in accordance with an example embodiment supports handover of one or more mobile nodes 300 in the Proxy Mobile IPv6 environment based on the software definition network. In this case, the openflow controller 100 includes a storage device 110 and a processor 120.

The storage device 110 included in the openflow controller 100 stores an application to performing a handover based on a handover policy for one or more mobile nodes 300. In this case, the storage device 110 is a generic term of non-volatile storage devices, which continue to maintain the stored information even when no power is supplied. For example, the storage device 110 may include NAND flash memories such as a compact flash (CF) card, a secure digital (SD) card, a memory stick, a solid-state drive (SSD), and a micro SD card, and magnetic computer storage devices such as a hard disk drive (HDD).

The processor 120 executes the application stored in storage device 110. That is, the processor 120 decides handover of the mobile node 300 in the state of being connected to the first mobile access gateway 500 and selects the second mobile access gateway 550 as a handover target.

In this case, the handover policy may be a reference for timing of handover for the mobile node 300 and a reference for selection of a handover target mobile access gateway.

In order to select a handover target mobile access gateway, the processor 110 may receive connection state information with respect to the mobile node 300 from each of a multiple number of mobile access gateways in the vicinity of the mobile node 300 and the first mobile access gateway 500. Based on the received connection state information, the processor 110 may decide handover timing of the mobile node 300 and a mobile access gateway having the highest possibility of connection to the mobile node 300 among the multiple mobile access gateways as the second mobile access gateway 550, which is a handover target.

For example, in response the handover policy stored in the storage device 110, the openflow controller 100 may monitor connection state information for the mobile node 300 connected to the first mobile access gateway 500, and decide a time point that the connection state information decreases to a preset threshold or less as timing of handover for the mobile node 300. Also, in response the handover policy, after the handover timing is decided, a mobile access gateway, for which connections state information is a threshold or more or the highest, may be selected as a handover target mobile access gateway of the mobile node 300.

In this case, the connection state information received from the first mobile access gateway 500 may include identification information of the mobile node 300 and a connection state value with respect to the mobile node 300. The connection state information received from the multiple mobile access gateways other than the first mobile access gateway 500 may include a connection state value by a snapshot with respect to the mobile node 300.

The openflow controller 100 may further include a database 130. In this case, the database 130 may be a server program provided in the openflow controller 100, and an independent database server connected to a digital contents recommendation terminal 100 through a network.

The database 130 may be embodied as at least one of non-volatile memory devices such as a read only memory (ROM), a programmable ROM (PROM), an erasable programmable ROM (EPROM), an electrically erasable programmable ROM (EEPROM) and a flash memory, volatile memory devices such as a random access memory (RAM), and storage media such as a hard disk drive and CD-ROM, but not be limited thereto.

The database 120 may store the connection state information with respect to the mobile node 300 by the mobile access gateways. The connection state information stored in the database may be used to select handover timing and a handover target mobile access gateway. To this end, where newly received connection state information is a preset threshold or more, the database 130 may renew the connection state information with respect to the mobile node 300 to the newly received connection state information.

Meanwhile, the processor 110 may implement self-authentication based on the connection state information with respect to the mobile node 300, which is stored by the mobile access gateways. In this case, the self-authentication may be implemented by using the identification information of the mobile node 300, which is included in the connection state information. After successful implementation of the self-authentication, the processor 110 may replace the identification information of the currently connected mobile access gateway, which is stored in the connection state information, with identification information of a handover target mobile access gateway.

For example, the self-authentication may be implemented based on the connection state information pre-stored in the database 120 with respect to the mobile node 300 and the second mobile access gateway 550, which is a handover target. In this case, the pre-stored connection information may be connection state information, which is stored when the mobile node 300 is connected to the second mobile access gateway 550 for the first time. If the mobile node 300 is connected to the second mobile access gateway 550 for the first time, the processor 120 of the openflow controller 100 may implement authentication for the mobile node 300 through the authentication authorization accounting server 600, and if the authentication is successfully implemented, the processor may store, in the database 120, the connection state information including the information of the second mobile access gateway 550 and information of the mobile device 300. Thereafter, when the mobile node 300 hands over to the second mobile access gateway 550 once again, the processor 110 may implement self-authentication by using the previously stored connection state information.

In response the handover policy, the processor 110 may send a message to each of the first mobile access gateway 500, the second mobile access gateway 550, and the localized mobility anchor 400. Accordingly, the message, the processor 110 may allow the localized mobility anchor 400 to deliver data packets to the mobile node 300 through the handed-over second mobile access gateway 550, instead of the first mobile access gateway 500, after the selection of the second mobile access gateway 550 as a handover target.

Specifically, the message, which is sent to each of the openflow controller 100, the mobile node 300, the first mobile access gateway 500, the second mobile access gateway 550 and the localized mobility anchor 400, may be any one of a tunnel initialization message, a proxy binding update (PBU) message, a proxy binding acknowledgement (PBA) message, a redirect request message, a router advertisement (RA) message, an openflow router advertisement (OF-RA) message, a router solicitation (RS) and an openflow router solicitation (OF-RS) message.

For example, after selecting the second mobile access gateway 550 as a handover target, the processor 110 of the openflow controller 100 may send a tunnel initialization message to the second mobile access gateway 550 so as to create a provisional bidirectional tunnel between the second mobile access gateway 550 and the localized mobility anchor 400. After the transmission of the tunnel initialization message, the processor 110 may send a proxy binding update message to the localized mobility anchor 400.

Before receiving a proxy binding acknowledgement message in response to the proxy binding update message sent to the localized mobility anchor 400, the processor 110 may send a redirect request message to the mobile node 300 through the first mobile access gateway 500.

The processor 110 may receive an openflow router advertisement message, which is created in the mobile node 300 in response to the redirect request message sent to the mobile node 300 and delivered through the second mobile access gateway 550. If the processor 110 fails to receive the openflow router advertisement message within pre-set time, it may resend the redirect request message to the mobile node 300 through the first mobile access gateway 500. In this case, the redirect request message may be a message that allows the mobile node 300 to disconnect the connection to the first mobile access gateway 500 and attempt connection to the second mobile access gateway 550, which is a handover target.

After receiving the proxy binding acknowledgement message from the localized mobility anchor 400, the processor 110 may send an openflow router advertisement message to the mobile node 300 through the second mobile access gateway 550 so as to change the provisional bidirectional tunnel into the conclusive state.

Once the second mobile access gateway 550 that has received the openflow router advertisement message exchanges a router solicitation and a router advertisement message with the mobile node 300 and sends an openflow router request message to the processor 110 of the openflow controller 100, the process 110 may receive the openflow router solicitation to finish the handover.

Meanwhile, handover delay may occur during the time when the connection between the mobile node 300 and the first mobile access gateway 500 is disconnected, and connection between the mobile node 300 and the second mobile access gateway 550 is attempted. Data packets, which have been sent from the localized mobility anchor 400 to the second mobile access gateway 550 through the bidirectional tunnel during the handover delay, may be buffered by the second mobile access gateway 550. The data packets being buffered may be delivered to the mobile node 300 after the openflow router advertisement message is sent to the mobile node 300.

In this case, the processor 110 may implement communication with the first mobile access gateway 500 and the second mobile access gateway 550 based on a preset openflow protocol. In addition, the processor 110 may implement communication with the localized mobility anchor 400 based on the transmission control protocol/internet protocol (TCP/IP).

In addition, the redirect request message may be delivered from the first mobile access gateway 500 to the mobile node 300 by using a data link layer.

Once the handover is completed as described above, the mobile node 300 may implement data communication with the corresponding node 350 through the second mobile access gateway 550 connected to the localized mobility anchor 400 through the bidirectional tunnel 400 as shown in (B) of FIG. 2.

Figure 4:
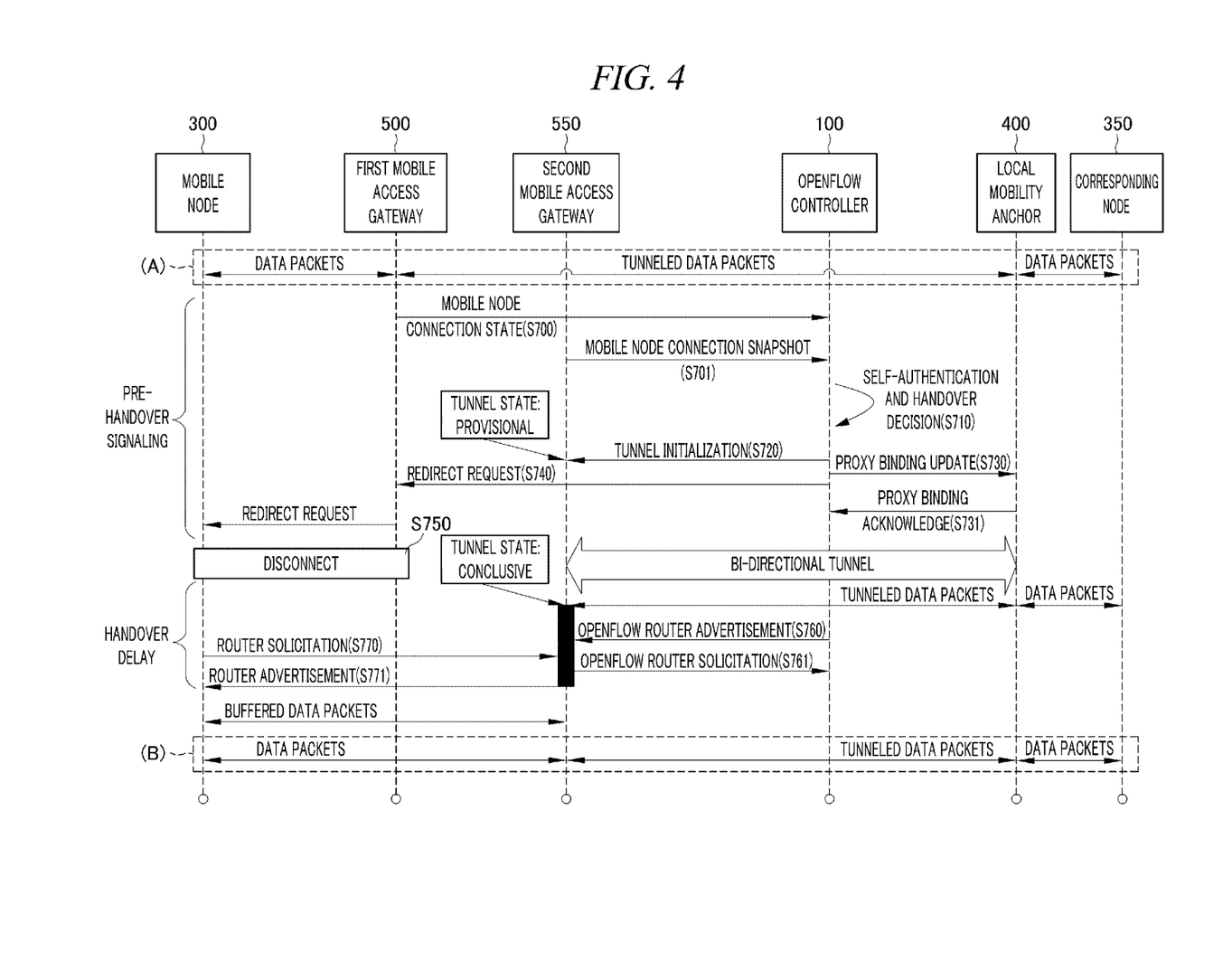
FIG. 4 is a flow chart of a method for controlling an openflow controller for supporting handover of a mobile node in accordance with an example embodiment.

Next, a control method of the openflow controller 100 for supporting handover of the mobile node 300 in Proxy Mobile IPv6 based on the software definition network is described referring to FIG. 4.

FIG. 4 is a flowchart for depicting a control method of the openflow controller 100 for supporting handover of the mobile node 300 in accordance with an example embodiment.

Referring to (A) of FIG. 4, the mobile node 300 may implement data communication with the corresponding node 350 through the first mobile access gateway 500 connected to the localized mobility anchor 400 by using the bidirectional tunnel.

The openflow controller 100 in accordance with an example embodiment monitors connection state information of the first mobile access gateway 500 connected to the mobile node 300 in response a preset handover policy (S700), decides handover of the mobile node 300 before the connection of the mobile node 300 and the first mobile access gateway 500 is disconnected, and selects a handover target.

To this end, the openflow controller 100 may receive connection state information with respect to the mobile node 300 from each of the multiple mobile access gateways in the vicinity of the mobile node 300 and the first mobile access gateways 500 (S700, S701). In this case, the connection state information received from the mobile access gateways may include identification information of the mobile node 300 and a value for the connection state between the mobile access gateways and the mobile node 300.

For example, the connection state value may be a value obtained from measuring received signal strength of the mobile node 300 in each of the mobile access gateways. In addition, the connection state information received from the multiple mobile access gateways may include connection state values with respect to the mobile node 300 by snapshots automatically taken in each of the mobile access gateways (S701).

The openflow controller 100 that has received the connection state information for the first mobile access gateway 500 and the multiple mobile access gateways decides handover of the mobile node 300, which is being connected to the first mobile access gateway 500, in response the handover policy (S710). Also, the openflow controller 100 may decide, as a handover target mobile access gateway, the second mobile access gateway 550, which is the most likely to be connected to the mobile node 300 among the multiple access gateways, based on the connection state information in response the handover policy.

In this case, as described above, the handover policy may be a reference for timing of handover and selecting a handover target mobile access gateway. For example, in response the handover policy, the openflow controller 100 may monitor connection state information of the mobile node 300 connected to the mobile access gateway, and decide a time point that the connection state information decreases to a preset threshold or less as timing of handover. In addition, in response the handover policy, a mobile access gateway, for which the monitored connection state information is a threshold or more or the highest, may be selected as a handover target mobile access gateway.

After selecting the second mobile access gateway 550 as a handover target mobile access gateway, the openflow controller 100 may implement self-authentication of the mobile node 300 for the second mobile access gateway 550 based on the connection state information with respect to the mobile node 300, which has been stored by the mobile access gateways (S710).

In this case, as described above, the self-authentication may be implemented by using the identification information of the mobile node 300 included in the connection state information. For example, the self-authentication may be implemented based on the pre-stored connection state information with respect to the mobile node 300 and the handover target mobile access gateway. In this case, the pre-stored connection state information may be connection state information stored when the mobile node 300 is connected to the handover target mobile access gateway for the first time. If the mobile node 300 is connected to the mobile access gateway for the first time, the openflow controller 100 may implement authentication for the mobile node 300 through the authentication authorization accounting server 600, and if the authentication is successfully implemented, the openflow controller 100 may store the connection state information including the information of the mobile access gateway information and the information of the mobile node 300. When handover occurs later, the openflow controller 100 may implement self-authentication by using the pre-stored connection state information.

After the handover target mobile access gateway is selected, the openflow controller 100 may allow the localized mobility anchor 400 to deliver data packets to the mobile node 300 through the second mobile access gateway 550, instead of the first mobile gateway 500. To this end, the openflow controller 100 may set up a bidirectional tunnel for data communication between the second mobile access gateway 550 and the localized mobility anchor 400. The openflow controller 100 may send a tunnel initialization message to the second mobile access gateway 550 so as to create a provisional bidirectional tunnel between the second mobile access gateway 550 and the localized mobility anchor 400 (S720).

In addition, the openflow controller 100 may send a proxy binding update message to the localized mobility anchor 400 in order to create the bidirectional tunnel (S730). The localized mobility anchor 400 that has received the proxy biding update message may send a proxy binding acknowledge message in response to the proxy binding update message (S731).

The second mobile access gateway 550 may create a bidirectional tunnel with the localized mobility anchor 400 that has exchanged the proxy binding update message and the proxy binding acknowledge message with the openflow controller 100. The second mobile access gateway 550 may store data packets received from the localized mobility anchor 400 through the bidirectional tunnel in the buffer included in the second mobile access gateway 550 until the connection to the mobile node 300 is completed.

Meanwhile, the openflow controller 100 may send a redirect request message, which will be delivered to the mobile node 300, to the first mobile access gateway 500 prior to receiving the proxy binding acknowledge message in response to the proxy binding update message (S740). The first mobile access gateway 500 that has received the redirect request message may deliver the redirect request message to the mobile node 300 (S741). In this case, the redirect request message may be a message, which allows the mobile node 300 to disconnect the connection to the first mobile access gateway 500 and attempt connection to the second mobile access gateway 550.

The openflow controller 100 that has received the proxy binding acknowledge message may send an openflow router advertisement message to the second mobile access gateway 550 so as to change the provisional bidirectional tunnel into the conclusive state (S760). In addition, the mobile node 300 that has received the redirect request message may send a router solicitation message to the second mobile access gateway 550 for connection to the second mobile access gateway 550 (S770).

The second mobile access gateway 550 that has received the openflow router advertisement message from the openflow controller 100 and the router solicitation message from the mobile node 300 may send an openflow router solicitation message to the openflow controller 100 (S761), and send a router advertisement message to the mobile node 300 (S771).

Once the mobile node 300 receives the router advertisement message so that the handover is completed, the second mobile access gateway 550 may send data packets buffered during the handover delay to the mobile node 300 to complete the handover (S772).

If the openflow controller 100 fails to receive the openflow router solicitation message sent from the second mobile access gateway 550 within preset time, the openflow controller 100 may send a redirect request message to the second mobile access gateway 550 again.

Once the handover is completed, the mobile node 300 may implement data communication with the corresponding node 350 through the second mobile access gateway 550 connected to the localized mobility anchor 400 by using the bidirectional tunnel as shown in (B) of FIG. 4. Meanwhile, communication between the openflow controller 100 and the first and second mobile access gateways 500, 550 may be implemented based on a preset openflow protocol. Communication between the openflow controller 100 and the localized mobility anchor 400 may be implemented based on a TCP/IP protocol.

The openflow controller 100 for supporting handover in Proxy Mobile IPv6 based on the software definition network and a control method thereof in accordance with an example embodiment can monitor the connection state information of the mobile access gateway connected to the mobile node 300 and decide and implement handover before the connection between the mobile node 300 and the mobile access gateway is disconnected. Further, since the openflow controller 100 for supporting handover in Proxy Mobile IPv6 based on the software definition network and a control method thereof implement self-authentication upon occurrence of handover based on the connection state information stored in the openflow controller 100 without authentication by the authentication authorization accounting server, handover delay time can be reduced, and data packets loss can be minimized through buffering during the handover delay time. As a result, the openflow controller 100 for supporting handover in Proxy Mobile IPv6 based on the software definition network and a control method thereof can provide seamless mobility in a real-time application.

Furthermore, since the openflow controller 100 for supporting handover in Proxy Mobile IPv6 based on the software definition network and a control method thereof can balance load of the network concentrated on the mobile access gateway by using the openflow controller 100, deterioration of performance of the network resulting from congestion upon data transmission can be reduced.

Example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the example embodiments have been described in relation to the certain examples. However, the components or parts or all the operations of the method and the system may be embodied using a computer system having universally used hardware architecture.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. An openflow controller to support handover of mobile nodes in Internet Protocol version 6 (IPv6) based on a software definition network, the openflow controller comprising:
    a storage device configured to store an application to perform a handover based on a handover policy; and
    a processor configured to, in response to implementing the application stored in the storage device,
        determine handover of a mobile node connected to a first mobile access gateway and select a second mobile access gateway as a handover target,
        send a message to the first mobile access gateway, the second mobile access gateway, and a localized mobility anchor connected to the openflow controller, to allow the localized mobility anchor to deliver data packets to the mobile node through the second mobile access gateway, based on the handover policy, and
        send, prior to receiving a proxy binding acknowledge message in response to a sending of a proxy binding update message, a redirect request message, to the first mobile access gateway, to be delivered to the mobile node through the first mobile access gateway,
    wherein the processor is configured to resend the redirect request message to be delivered to the mobile node through the first mobile access gateway, in response to the processor failing to receive an openflow router advertisement message within a time period.

2. The openflow controller of claim 1,
    wherein the processor is further configured to receive connection state information with respect to the mobile node from each of a plurality of mobile access gateways in a vicinity of the mobile node and the first mobile access gateway, and to determine handover timing of the mobile node and the second mobile access gateway based on the connection state information.

3. The openflow controller of claim 2, wherein
    the connection state information received from the first mobile access gateway comprises identification information of the mobile node and a connection state value with respect to the mobile node, and
    the connection state information received from the plurality of the mobile access gateways comprises the connection state value with respect to the mobile node by a snapshot.

4. The openflow controller of claim 2, further comprising a database configured to store the connection state information with respect to the mobile node by the mobile access gateways, and to renew the connection state information with respect to the mobile node with newly received connection state information, in response to the newly received connection state information meeting or exceeding a threshold.

5. The openflow controller of claim 4, wherein
the processor is further configured to implement self-authentication based on the connection state information with respect to the mobile node, which is stored by the mobile access gateways, and
the implementing of the self-authentication relates to implementing authentication for the mobile node connected to the mobile access gateway.

6. The openflow controller of claim 2, wherein the processor is configured to decide a time point that the connection state information decreases to a first threshold or less as timing of handover for the mobile node, and select a mobile access gateway of which connection state information is a second threshold or more or highest as the second mobile access gateway.

7. The openflow controller of claim 1,
wherein the processor is further configured to
after selecting the second mobile access gateway as the handover target, send a tunnel initialization message to the second mobile access gateway and send the proxy binding update message to the localized mobility anchor to create a provisional bidirectional tunnel between the second mobile access gateway and the localized mobility anchor,
prior to receiving the proxy binding acknowledge message in response to the sending of the proxy binding update message, send the redirect request message to be delivered to the mobile node through the first mobile access gateway,
resend the redirect request message, in response to the processor failing to receive, within a time period, the openflow router advertisement message, which is created in response to the redirect request message to be delivered through the second mobile access gateway, and
after receiving the proxy binding acknowledge message, send the openflow router advertisement message through the second mobile access gateway to change the provisional bidirectional tunnel into a conclusive state,
wherein the redirect request message allows the mobile node to disconnect from the first mobile access gateway and to attempt to connect to the second mobile access gateway, and
wherein data packets sent from the localized mobility anchor to the second mobile access gateway through the bidirectional tunnel to be buffered are delivered to the mobile node after the openflow router advertisement message is delivered to the mobile node.

8. The openflow controller of claim 7,
wherein the processor is further configured to implement communication with the first mobile access gateway and the second mobile access gateway based on an openflow protocol, and
wherein communication with the localized mobility anchor is based on an Internet Protocol version 6 (IPv6).

9. The openflow controller of claim 7,
wherein the redirect request message is delivered from the first mobile access gateway to the mobile node using a data link layer.

10. The openflow controller of claim 1, wherein the processor is further configured to, after selecting the second mobile access gateway as the handover target and prior to the sending and the resending of the redirect request message, send a tunnel initialization message to the second mobile access gateway and send the proxy binding update message to the localized mobility anchor to create a provisional bidirectional tunnel between the second mobile access gateway and the localized mobility anchor.

11. The openflow controller of claim 10, wherein the processor is further configured to, after receiving the proxy binding acknowledge message, send the openflow router advertisement message through the second mobile access gateway to change the provisional bidirectional tunnel into a conclusive state.

12. The openflow controller of claim 11, wherein the openflow router advertisement message is created in response to the redirect request message to be delivered through the second mobile access gateway.

13. The openflow controller of claim 12, wherein the redirect request message allows the mobile node to disconnect from the first mobile access gateway and to attempt to connect to the second mobile access gateway.

14. A method of supporting handover of mobile nodes in Internet Protocol version 6 (IPv6) based on a software definition network, the method comprising:
determining handover of a mobile node connected to a first mobile access gateway based on a handover policy;
selecting a second mobile access gateway as a handover target based on the handover policy;
sending a message to the first mobile access gateway, the second mobile access gateway, and a localized mobility anchor connected to an openflow controller, to allow the localized mobility anchor to deliver data packets to the mobile node through the second mobile access gateway, based on the handover policy;
sending, prior to receiving a proxy binding acknowledge message in response to a sending of a proxy binding update message, a redirect request message, to the first mobile access gateway, to be delivered to the mobile node through the first mobile access gateway; and
resending the redirect request message to be delivered to the mobile node through the first mobile access gateway, in response to failing to receive an openflow router advertisement message within a time period.

15. The control method of claim 14, wherein the selecting of the handover target comprises:
receiving connection state information with respect to the mobile node from each of a plurality of mobile access gateways in the vicinity of the mobile node and the first mobile access gateway; and
determining handover timing of the mobile node and the second mobile access gateway based on the connection state information.

16. The control method of claim 15, wherein
the connection state information received from the first mobile access gateway comprises identification information of the mobile node and a connection state value with respect to the mobile node, and
the connection state information received from the plurality of the mobile access gateways comprises a connection state value with respect to the mobile node by a snapshot.

17. The control method of claim 14, further comprising implementing self-authentication of the mobile node for the second mobile access gateway based on the connection state information with respect to the mobile node, wherein the connection state information with respect to the mobile node is stored by the mobile access gateways.

18. The control method of claim 14,
wherein the sending of the message comprises
after the selection of the handover target, sending a tunnel initialization message to the second mobile access gateway and sending the proxy binding update message to the localized mobility anchor to create a provisional bidirectional tunnel between the second mobile access gateway and the localized mobility anchor,
prior to receiving the proxy binding acknowledge message in response to the sending of the proxy binding update message, sending the redirect request message to be delivered to the mobile node through the first mobile access gateway,
resending the redirect request message, in response to not receiving, within a time period, the openflow router advertisement message, which is created in the mobile node in response to the redirect request message to be delivered through the second mobile access gateway and
sending the openflow router advertisement message to be delivered to the mobile node through the second mobile access gateway to change the provisional bidirectional tunnel into a conclusive state,
wherein the redirect request message allows the mobile node to disconnect from the first mobile access gateway and to attempt to connect to the second mobile access gateway, and
wherein the data packets transmitted from the localized mobility anchor to the second mobile access gateway through the bidirectional tunnel to be buffered are delivered to the mobile node after the openflow router advertisement message is delivered to the mobile node.

* * * * *

UNITED STATES PATENT AND TRADEMARK OFFICE
CERTIFICATE OF CORRECTION

Page 1 of 1

PATENT NO. : 9,992,718 B2
APPLICATION NO. : 14/926428
DATED : June 5, 2018
INVENTOR(S) : Hyunseung Choo et al.

It is certified that error appears in the above-identified patent and that said Letters Patent is hereby corrected as shown below:

On the Title Page

Item (72) Inventors should read:
Hyunseung Choo, Gwacheon-si (KR);
Syed Muhammad Raza, Suwon-si (KR);
Dongsoo Kim, Seoul (KR); Jinwoo Park,
Bucheon-si (KR); Sang Gil Yeoum, Seoul (KR)

Signed and Sealed this
Twenty-fourth Day of July, 2018

Andrei Iancu
*Director of the United States Patent and Trademark Office*